United States Patent [19]

Orengo

[11] Patent Number: 5,389,838

[45] Date of Patent: Feb. 14, 1995

[54] DEVICE AND METHOD OF MANAGING ASYNCHRONOUS EVENTS IN A FINITE STATE MACHINE

[75] Inventor: Gerard Orengo, Biot, France

[73] Assignee: International Business Machines Corporation, Armonk, N.Y.

[21] Appl. No.: 124,739

[22] Filed: Sep. 21, 1993

[30] Foreign Application Priority Data

Oct. 9, 1992 [EP] European Pat. Off. ......... 92480147.5

[51] Int. Cl.⁶ .................... H03K 19/00; H03K 19/173
[52] U.S. Cl. ....................................... 326/93; 326/46; 327/141
[58] Field of Search ............ 307/465, 480, 269, 272.1; 328/72, 63

[56] References Cited

U.S. PATENT DOCUMENTS

| | | | |
|---|---|---|---|
| 5,015,871 | 5/1991 | Sirabella | 307/269 |
| 5,097,151 | 3/1992 | Eerenstein et al. | 307/480 |
| 5,155,380 | 10/1992 | Hwang et al. | 307/269 |
| 5,159,278 | 10/1992 | Mattison | 307/465 |
| 5,204,555 | 4/1993 | Graham et al. | 307/480 |
| 5,274,281 | 12/1993 | Hay | 307/480 |
| 5,291,528 | 3/1994 | Vermeer | 307/269 |

FOREIGN PATENT DOCUMENTS

356940 8/1989 European Pat. Off. .
4111069 5/1991 Germany .

Primary Examiner—Edward P. Westin
Assistant Examiner—Richard Roseen
Attorney, Agent, or Firm—Joscelyn G. Cockburn

[57] ABSTRACT

A finite state machine connected to a plurality of units which enables to manage the execution of M asynchronous signals to select one of these M asynchronous signals which may become a user clock at a moment which is independent from the pulse of the state machine clock within a minimum of time. The state machine comprises a combinational logic circuit (1) receiving a set of primary input signals (3) which contains N asynchronous input signals and outputting state variable output signals (6) to a state variable register (2). The register (2) is driven by a clock signal (7) which is the clock signal of the state machine and provides M state variable register output signals (51, 52) to M additional latches (10, 20) which delay the signal until they receive a timing pulse (71 or 72) from the combinational circuit. The moment when a pulse is generated is defined by one of the M equations determined by a particular need whose requirements are inputted among the set of primary input signals (3) in the combinational circuit, the equation may also depend on the variable which indicates the signal selected by means of line (50) looping back to combinational logic circuit so that said state machine may be used as a clock select selecting one of the clock input signal to become a user clock; and each time an equation is satisfied, the combinational circuit generates a timing pulse to the corresponding latch which generates then an output signal (53 or 54) to the different units and also to the combinational circuit to indicate the present state of the state machine. Those output signals (53, 54) may be used in connection with a selection means (110) to select which clock input signal is to become a user clock.

4 Claims, 9 Drawing Sheets

CIRCUIT WITH 3 LATCHES AND 2 ASYNCHRONOUS OUTPUTS.

ENVIRONMENT OF THE STATE MACHINE

FIG. 1
MEALY STATE MACHINE
PRIOR ART

FIG. 2
MOORE STATE MACHINE
PRIOR ART

FIG. 3-A
CASCADING STATE MACHINES
PRIOR ART

FIG. 3-B
STATE DIAGRAM
PRIOR ART

FIG. 4-A
CIRCUIT WITH 3 LATCHES AND 2 ASYNCHRONOUS OUTPUTS.

FIG. 4-B
STATE DIAGRAM OF THE
PREFERRED IMPLEMENTATION.

FIG. 7
CLOCK DECODE FOR ADDITIONAL LATCHES L1, L2.

DEVICE AND METHOD OF MANAGING ASYNCHRONOUS EVENTS IN A FINITE STATE MACHINE

FIELD OF THE INVENTION

The present invention relates to a finite state machine to be used in a control device or a control circuit to manage the execution of asynchronous signals and more particularly to a finite state machine which enables to select one of the asynchronous signals at a moment which is independent from the pulse of the state machine clock within a minimum of time.

BACKGROUND ART

In order to solve the problem of executing a decision taken by a state machine at the very moment that is required by a particular need, there are two kinds of state machine in the prior art which are commonly used: the Mealy and the Moore state machines.

Those machines are implemented with the required improvements according to the environment and the functions that those state machines are expected to perform. They are used in a synchronous environment, and they do not enable to manage asynchronous events because they take their decisions at moments which depend on their own clock.

Figure 1:
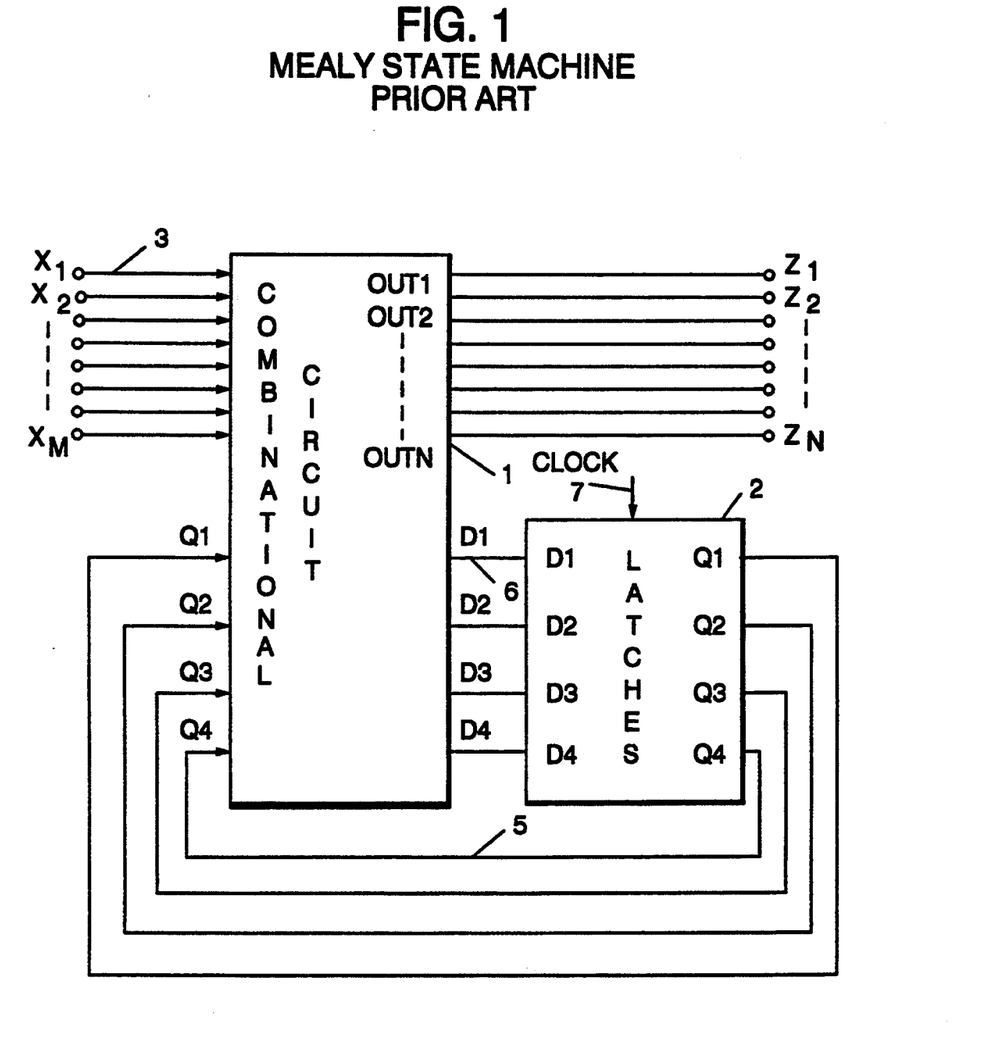
FIG. 1 represents the circuit of a Mealy state machine in the prior art.

The second edition of "Fundamentals of logic design" of Charles H. ROTH, Jr, West Publishing company discloses some fundamental examples of the state machines. The Mealy state machine is represented in FIG. 1. It comprises a combinational circuit (1) which receives a set of input signals (3) and a state variable register (2) whose inputs are generated by the outputs (D1, D2,...,D4) of the combinational circuit. Said state variable register outputs signals (Q1, Q2,...,Q4) which loop back to the combinational circuit. When a set of inputs (X1, X2,..., Xm) is generated to the Mealy state machine, the combinational circuit generates the set of outputs (Z1, Z2,..., Zn) and the flip-flop inputs (D1, D2,.... Dk) which loop back to the combinational logic through the state variable register (2) generating signals (Q1, Q2,..., Q4). This process is repeated for each set of inputs. Instead of using the D flip-flops, a similar model may be used for any type of clocked flip-flop. The clock pulse enables to synchronize the operation of the flip-flops and to prevent the timing problems. The gates in the combinational circuit have finite propagation delays, so when the inputs to the state machine are changed, a finite time is required before the flip-flop inputs reach their final values. Because the gate delays are not all the same, the flip-flop input signals may contain transients and they may change at different times. Since the clock pulse is not applied until all flip-flop input signals have reached their final steady-state values, the unequal gate delays do not cause any timing problems. All flip-flops which must change state do so at the same time. When the flip-flops change state, the new flip-flop outputs are fed back into the combinational circuit. However, no further change in the flip-flop states can occur until the next clock pulse.

Figure 2:
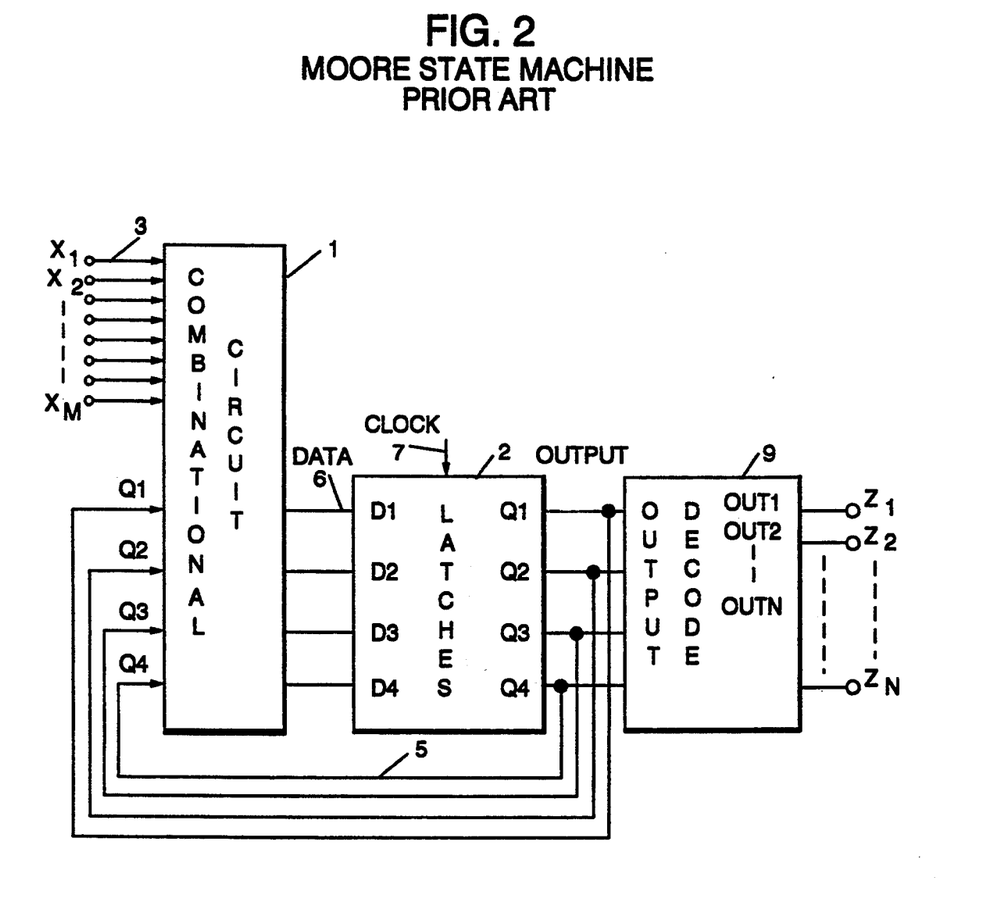
FIG. 2 represents the circuit of a Moore state machine in the prior art.

The general model for the clocked Moore state machine in FIG. 2 is similar to the clocked Mealy machine. The output decode (9) is separated from the combinational logic (1) and the register (2) in the Moore machine because the outputs set (Z1, Z2,...,Zn) depends only on the present state of the flip-flops and not on the state machine set of inputs (X1, X2 ...., Xm). The operation of the Moore machine is similar to that of the Mealy except when a set of inputs is applied to the Moore machine, the resulting outputs do not appear until after the clock pulse causes the flip-flops to change state.

The main drawback of both state machines is that they cannot be used as such in an asynchronous environment without any improvement, because the moment when the decision is to be taken by the state machine is defined by external asynchronous events independent from the clock of the state machine.

Figure 3:
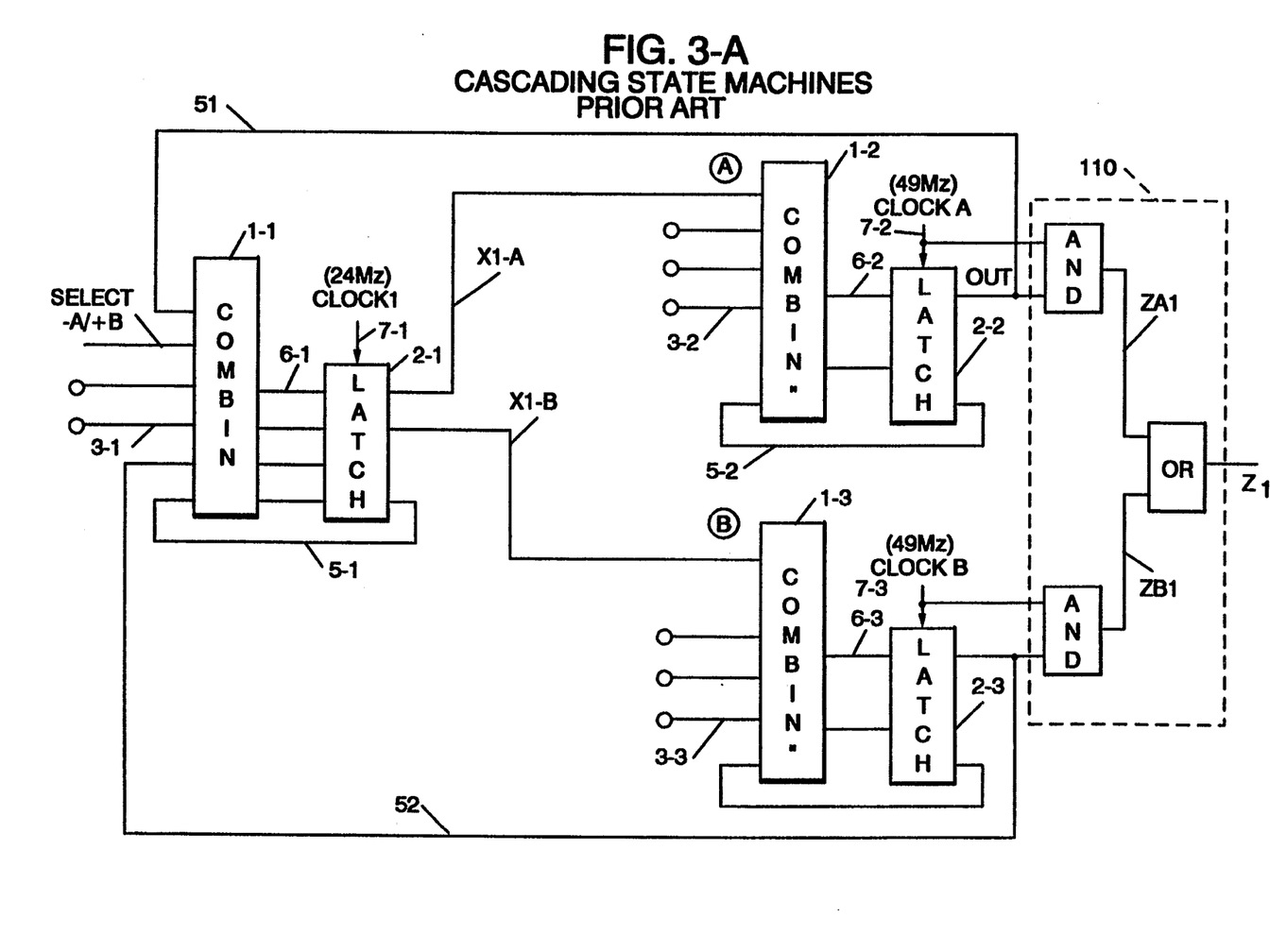

Therefore, in order to solve this problem, one may implement cascading state machines of the Moore type, refer to FIG. 3-A, receiving a set of input signals (X1, X2,...,Xm) on outputs 3-1 and outputting a set of signals (Z1, Z2 .... Zn). The first combinational circuit (1-1) which receives the inputs (X1, X2,...,Xm) comprising the clock select $-A/+B$ input signal (CS) and provides signals (6-1) to its associated latch (2-1) which is driven by signals (7-1) of clock 1 (24 Mz). The latch (2-1) outputs signals (X1-A) to the second combinational circuit (1-2) which also receives inputs (3-2), and signals (X1-B) to the third combinational circuit (1-3) which also receives inputs (3-3), and signals (5-1) which loop back to the combinational circuit (1-1).

The second and third combinational circuits (1-2, 1-3) respectively have their own latches (2-2, 2-3) which are driven by signals (7-2, 7-3) of clocks A and B. Those latches (2-2, 2-3) output signals (51, 52) which loop back to the first combinational circuit (1-1) and signals to the selection circuit (110) of the clock which generates outputs signals (Z1, Z2,...,Zn).

FIGS. 3-B, 3-C and 3-D show the state diagrams of the above cascading state machines used in the prior art. The master state machine (1-1, 2-1) has four states (S1, S2, SOA and SOB) and both slave state machines A and B have the respective states (S3, S4) associated to clock A, (S5, S6) associated to clock B. The state SOA means that clock A is chosen and will be activated at the right moment, so does state of SOB for clock B. It is impossible to have both clocks A and B switched on in the same time, therefore, as long as the CS is at a down-level and clock B is not switched off yet (nonCSononS5), the master state machine remains at SOA state. During that time, the state machines A and B are respectively at state S3 and state S6. As soon as clock B is switched off, the state machine B returns to the state S5, and the master state machine goes to state S1, while the state machine A goes from state S3 to state S4 which means that clock A is switched on. The master state machine is kept in the state S1 as long as the clock select is at a down-level. It goes to state SOB as soon as CS is set at a up-level and it will remain in this state as long as CS is at a down-level and clock A is switched on. During that time state machines A and B are respectively at states S4 and S5.

The passage from SOB to SOA via state S2 is similar to the passage from state SOA to SOB via S1.

The European patent application EP A2 356 940 discloses a finite state machine which enables to take into account a late input. In that finite state machine, the output of a late input is prepared and at the time when the late input is defined an output obtained through a usual process and the output thus prepared are switched in accordance with the late input. This state machine aims to improve the operation speed of the state machine in a synchronous environment where the late input is previously prepared and the output signal is ready to be generated through a selector control circuit to the output register driven a synchronous clock.

OBJECTS OF THE INVENTION

The main object of the present invention is to devise a state machine which can be used in an asynchronous environment where the execution phase of each event depends on external clocks or conditions independent from the state machine clock and to define a method which is to be used with the present state machine.

SUMMARY OF THE INVENTION

Therefore, in order to obtain the above object, the present invention implements a finite state machine connected to a plurality of units for managing the execution of M asynchronous signals to select a signal among a set of primary input signals received by the state machine and which includes N asynchronous input signals, at a moment which is independent from the clock signal of the state machine. The state machine comprises a combinational logic means receiving said set of primary input signals and outputting state variable output signals to a state variable register, said state variable register being driven by the clock signal of the state machine and providing M state variable register output signals, wherein N may be different from M, said finite state machine comprises:

- means for generating M timing pulses according to the N asynchronous input signals to indicate the moment of the selection, said means being connected to the combinational logic means, and
- means for receiving said M state variable register outputs and being driven by said M timing pulses to generate M output signals to the units, said M output signals loop back to the combinational logic means to indicate the present state of the state machine. This state machine is to used with the corresponding method comprising the steps of:
  - (a) receiving in the combinational logic means said set of primary input signals including the N asynchronous input signals,
  - (b) outputting from the combinational logic means, according to said primary input signals and the present state signals of the state machine which are the state variable input signals and the output signals of said M additional means, the state variable output signals of the state machine to said state variable register,
  - (c) generating from the state variable register M state variable register outputs,
  - (d) each one of said M additional means storing said M state variable register outputs, and
  - (e) generating from the combinational logic means a timing pulse (71 or 72) according to the N asynchronous input signals that are received among said set of primary inputs to a corresponding additional means, then said additional means generates a signal which enables to select one of the input signals among said set of primary inputs.

BRIEF DESCRIPTION OF THE DRAWINGS

FIG. 3-A represents the circuit of a cascading state machines in the prior art.

FIG. 3-B, 3-C, 3-D represent the state diagrams of the cascading state machines.

FIG. 4-A shows the circuit of the preferred embodiment of the subject invention with 3 latches and 2 asynchronous outputs.

FIG. 4-B shows the state diagram of the preferred embodiment.

DETAILED DESCRIPTION OF THE INVENTION

Figure 4:
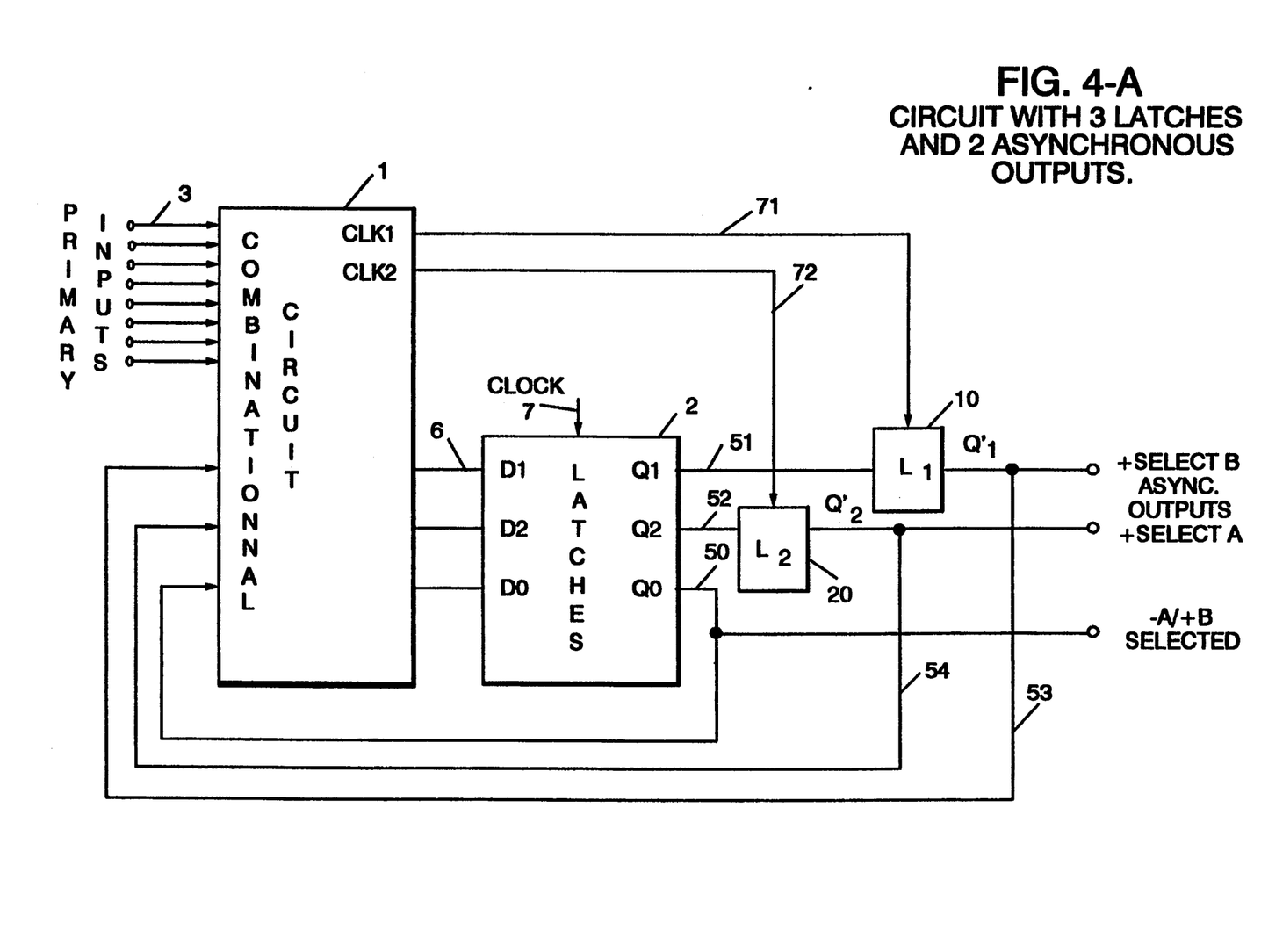

In FIG. 4-A, the combinational circuit (1) generates state variable output signals (6) of the next state of the state machine and also particular timing pulses (71, 72) for the additional latches called asynchronous output registers (10, 20) according to the primary inputs (3) and the present state (50, 53, 54). The state variable output signals (6) pass through the state variable register (2) to provide a state variable input signal (50) represented on the figure by a signal (−A/+B selected) becoming synchronous by the way, and the state variable register outputs (51, 52). The state variable input signal (50) is required in case the state machine is used for switching from one clock to another clock (for example from clock A to clock B). In that particular use, it is necessary for the state variable register (2) to indicate as soon as possible the clock selected to the combinational logic circuit (1). If it is not required, the signal (50) may be omitted.

The asynchronous output registers (10, 20) are respectively connected to the state variable register outputs (51, 52) and have their respective outputs (53, 54) which loop back to the combinational circuit (1) and which are provided to the inputs of a selection circuit (110) which will be described later on. Signals (53, 54, 50) constitute together the state variable input signals of combinational circuit. The clocks signals (71, 72) for the asynchronous output registers (10, 20) are generated by combinational circuit (1).

The next state of the state machine is inputted in the asynchronous output registers (10, 20) which are used to delay the transitions respectively on the inputs (51, 52) of a minimum time in order to have the first opportunity to satisfy the asynchronous need. The delay is defined by the equation of the clocks signals (71, 72) which corresponds to the asynchronous output registers (10, 20).

The clock of each asynchronous output register (10 or 20) is generated by the combinational logic circuit for each independent event. This clock is a pulse resulting from an equation defined by the problem to solve.

In the preferred embodiment, the problem to solve is to be able to choose between a clock A (48 Mz) and another clock B (48 Mz) in such a way that the switching is performed without glitch (i.e. without shortening the time at a uplevel or a down-level and without lengthening the time at up-level). Due to the user requirements, the switch off of the selected clock must be performed during the down-level of the user clock (24 Mz). Therefore, the only solution is to lengthen the time at low-level of a minimum time.

FIG. 4-B shows the state diagram of the preferred embodiment. For this description, the same wording and the same reference as the description of the prior art state diagram of FIG. 3-B, 3-C and 3-D are used.

There are also 4 principal states (SOA, SOB, S1, S2). For the preferred embodiment, the state machine has 4 external inputs: clock A (48 Mz), clock B (48 Mz), the selection signal A/B (clock select) and the user clock signal (24 Mz) coming from the selected clock (refer to FIG. 5). The clock signal (7) of the state machine is a permanent 24 Mz clock. It must stay in mind that those clocks (clocks A and B, and the clock of the state machine) are asynchronous.

The state machine has also 3 internal inputs (Q0, Q'1 Q'2) on lines (50, 53, 54) which indicate the present state of the state machine. Each state S1, S2, SOA and SOB is represented by the values of (Q0, Q'1, Q'2) which are the output of the state variable register (2) and the outputs of the additional latches (10, 20), wherein Q0 represents the clock selected latch, Q'2 the A clock gate, and Q'1 the B clock gate. Q0 is at a up-level when clock B is selected and down-level when clock A is selected. Q'1 is at a up-level when clock B which is selected is activated, and at a down-level when clock B which is selected is desactivated. So does Q'2 for clock A.

When the clock select (CS) which is an external input, is at a down-level (clock A is chosen), the passage from state S2 represented by the values of (1,1,0) to state SOA (0,0,0) is performed by means of the intermediate state S'2 (0,1,0). Internally, the state machine goes from state S2 to SOA because of the additional latch L2, the intermediate state S'2 is necessary to stop the clock B at the right moment which is the moment when clock B (48 Mz) and the user clock (24 Mz) are reset. Afterwards, state SOA goes to the state S1 as long as the clock select is at a down-level. It is the same for state S1 which Goes, when the CS signal is at an up-level (clock B is chosen), to the intermediate state S'1 conditioned by the simultaneous reset of clock A (48 Mz) and the user clock (24 Mz) because of the additional latch L1, before going to the state SOB. Afterwards, SOB goes to state S2 as long as the clock select signal remains at an up-level.

Figure 5:
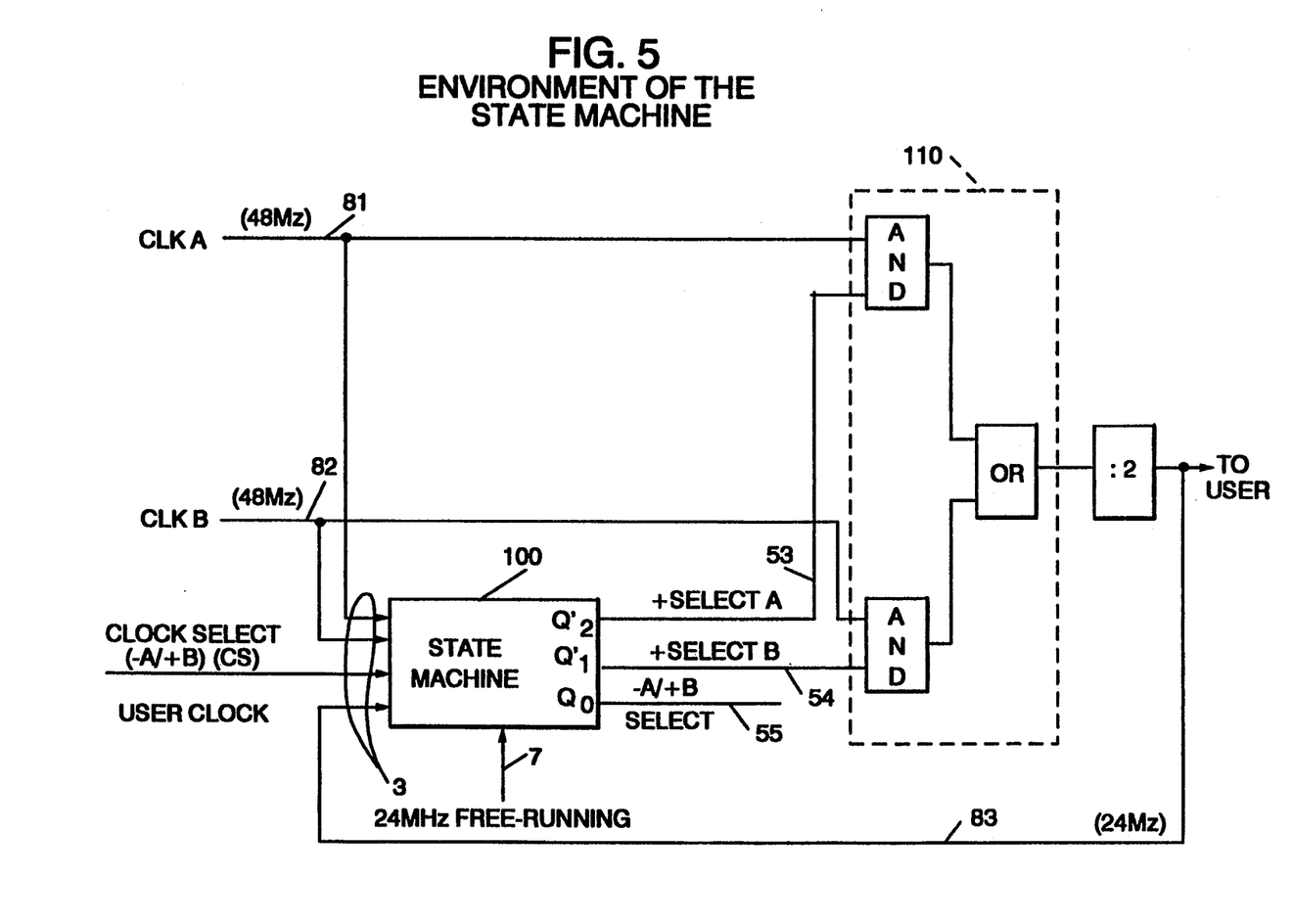
FIG. 5 shows the environment of the preferred embodiment.

FIG. 5 shows the environment of the preferred embodiment of the present invention. The 4 inputs (3) which are clock A, clock B, clock select (CS) and user clock are represented by lines (3). The state machine is driven by a free running clock signal (7). The state machine generates 2 asynchronous output signals which are +select A (53) and +select B (54) and one synchronous output signal which is the selected clock −A/+B (55) which may be used as if the present state machine is required to perform also the functions of the Moore machine (this output is not used in the present case as long as the present state machine is required to be implemented in an asynchronous environment).

A selection circuit is required in order to select among the clock signals the one which should be used by the user. The selection circuit (110) receives signals (81, 82) from clocks A and B and the signals (53, 54) from the state machine before it sends the selected signal divided by 2 to the user and to the state machine.

As the invention is used in different parts of a communication controller, a unique signal called CLOCK SELECT (CS) is generated for the whole machine in order to choose between clock A or a back-up clock B. This clock select signal constitutes one of the inputs (3) of the state machine. The difficulty for the state machine is to generate the signals (+select A) (54) and (+select B) (53) in such a way that their respective transitions from a down-level to a up-level and vice-versa happen during a down-level of both clocks (81 and 83 or 82 and 83) wherein the user clock (83) is issued from the selected clock. In that way, the selected clock will be stopped after an integer number of period. Once the first clock is stopped, the second clock may be activated as soon as it reaches the down-level. Therefore, the amount of time during which both clocks are stopped is minimum.

This part of the description shows the truth table of the preferred embodiment. The purpose of this table is to generate from the present state (Q0, Q'1, Q'2) and the primary inputs (clocks A, B, user clock) the next state (DO, D1, D2) and clocks (clk1, clk2) on lines (71, 72) for the additional latches (10, 20).

| ST | PRESENT STATE | | | PRIMARY INPUTS | | | | NEXT STATE | | | CLOCKS FOR ADDITIONAL LATCHES | | |
|---|---|---|---|---|---|---|---|---|---|---|---|---|---|
| | Q0 | Q'1 | Q'2 | CS | 48M CLKA | 48M CLKB | 24M USER | D0 | D1 | D2 | CL1 | CL2 | |
| SOA | 0 | 0 | 0 | 0 | 0 | X | X | 0 | 0 | 1 | 0 | 1 | CLKA ON |
|  | 0 | 0 | 0 | 0 | 1 | X | X | 0 | 0 | 1 | 0 | 0 | |
|  | 0 | 0 | 0 | 1 | X | X | X | 1 | 0 | 0 | 0 | 0 | |
| S1 | 0 | 0 | 1 | 0 | X | X | X | 0 | 0 | 1 | 0 | 0 | |
|  | 0 | 0 | 1 | 1 | 0 | X | 0 | 1 | 0 | 0 | 0 | 1 | CLKA OFF |
|  | 0 | 0 | 1 | 1 | 0 | X | 1 | 1 | 0 | 0 | 0 | 0 | |
|  | 0 | 0 | 1 | 1 | 1 | X | X | 1 | 0 | 0 | 0 | 0 | |
| S'2 | 0 | 1 | 0 | X | X | 0 | 0 | 0 | 0 | 0 | 1 | 0 | CLKB OFF |
|  | 0 | 1 | 0 | X | X | 0 | 1 | 0 | 0 | 0 | 0 | 0 | |
|  | 0 | 1 | 0 | X | X | 1 | X | 0 | 0 | 0 | 0 | 0 | |
| U | 0 | 1 | 1 | X | X | X | X | X | 0 | 0 | 1 | 1 | |
| SOB | 1 | 0 | 0 | 0 | X | X | X | 0 | 0 | 0 | 0 | 0 | |
|  | 1 | 0 | 0 | 1 | X | 0 | X | 1 | 1 | 0 | 1 | 0 | CLKB ON |
|  | 1 | 0 | 0 | 1 | X | 1 | X | 1 | 1 | 0 | 0 | 0 | |
| S'1 | 1 | 0 | 1 | X | 0 | X | 0 | 1 | 0 | 0 | 0 | 1 | CLKA OFF |
|  | 1 | 0 | 1 | X | 0 | X | 1 | 1 | 0 | 0 | 0 | 0 | |
|  | 1 | 0 | 1 | X | 1 | X | X | 1 | 0 | 0 | 0 | 0 | |
| S2 | 1 | 1 | 0 | 0 | X | 0 | 0 | 0 | 0 | 0 | 1 | 0 | CLKB OFF |
|  | 1 | 1 | 0 | 0 | X | 0 | 1 | 0 | 0 | 0 | 0 | 0 | |
|  | 1 | 1 | 0 | 0 | X | 1 | X | 0 | 0 | 0 | 0 | 0 | |
|  | 1 | 1 | 0 | 1 | X | X | X | 1 | 1 | 0 | 0 | 0 | |

| | PRESENT STATE | | | PRIMARY INPUTS | | | NEXT STATE | | | CLOCKS FOR ADDITIONAL LATCHES | |
|---|---|---|---|---|---|---|---|---|---|---|---|
| ST | Q0 | Q'1 | Q'2 | CS | 48M CLKA | 48M CLKB | 24M USER | D0 | D1 | D2 | CL1 | CL2 |
| U | 1 | 1 | 1 | X | X | X | X | X | 0 | 0 | 1 | 1 |

U = UNASSIGNED STATE (not defined)

The way to generate the next state from the present state is similar to the prior art, whereas the clocks clk1 and clk2 are generated according to a particular decode which depends on user requirements. In the present case, the clock A or B may only be switched off when both user clocks and clock A or B are at a down-level. Clock A or B is switched on when it is at a down level independently from the user clock.

Therefore, in the present invention, the clock clk1 and clk2 depend on more variables than in the prior art which are clocks A and B and user clock. For example, refer to the first and second lines of the truth table wherein the next state (D0, D1, D2) are equal to (0,0,1) because they do not depend on the clocks A, B and the user clock. Clock clk2 decodes changes from line 1 to line 2 because it depends on the present state and also on clock A.

From the requirements of the user and the present state, one can define entirely the truth table as shown above.

This truth table is summarized in the following table in order to establish the Karnaugh map which gives the equation of clock 1 according to the variables (Q0, Q'1, Q'2, ClkB, CS, user clock).

| Q0 | Q'1 | CS | 24M USER | CL1 |
|---|---|---|---|---|
| 0 | 1 | X | 0 | 1 |
| 1 | 0 | 1 | X | 1 |
| 1 | 1 | 0 | 0 | 1 |

WITH Q'2 = 0, 48M_CLKB = 0,
AND DON'T CARE OF 48M_CLKA

+ Q'1.Q'2

| CS 24M \ Q0 Q'1 | 00 | 01 | 11 | 10 |
|---|---|---|---|---|
| 00 | | 1 | 1 | |
| 01 | | | | |
| 11 | | | | 1 |
| 10 | | | 1 | 1 |

THEN CL1 = (Q'1.Q'2) + $\overline{(Q'2.48M\_CLKB)}$.$\overline{(CS.24M.Q'1}$ + CS.Q0.Q'1 + 24M.Q0.Q'1)

The Karnaugh map of clock 2 is established in the same way as the Karnaugh map of clock 1 and its equation is:

$Clk2 = (Q'1·Q'2) + (Q'1·CLKA)·(CS·UserClk·Q'2 + CS·Q0·Q'2 + UserClk·Q0·Q'2)$

Figure 6:
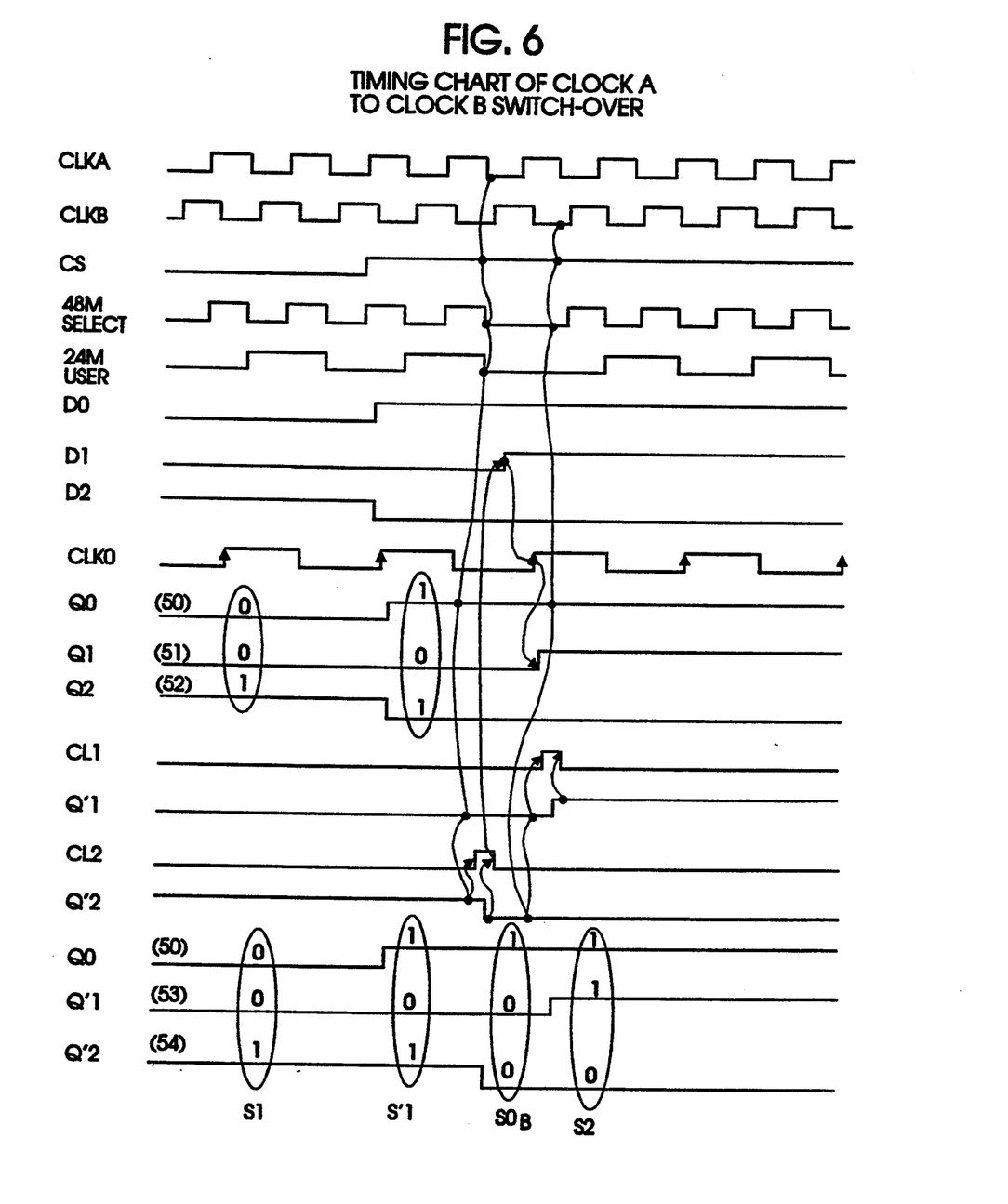
FIG. 6 shows the operation timing chart.

FIG. 6 shows the timing chart of preferred embodiment when the switch over is required from clock A to clock B. The input signals of the combinational circuit are clk A, clk B, CS, user clock, and the state variable input signals (Q0, Q'1, Q'2) in order to generate the state variable outputs signals (D0, D1, D2) to feed the state variable register (2) which is clocked by clk0 and which generates the state variable register outputs (Q0, Q1, Q2).

The clocks clk1 and clk2 are coming from the special decode. This special decode will generate a pulse each time its equation is satisfied, this corresponds to the right moment when asynchronous output may be switched.

Figure 7:
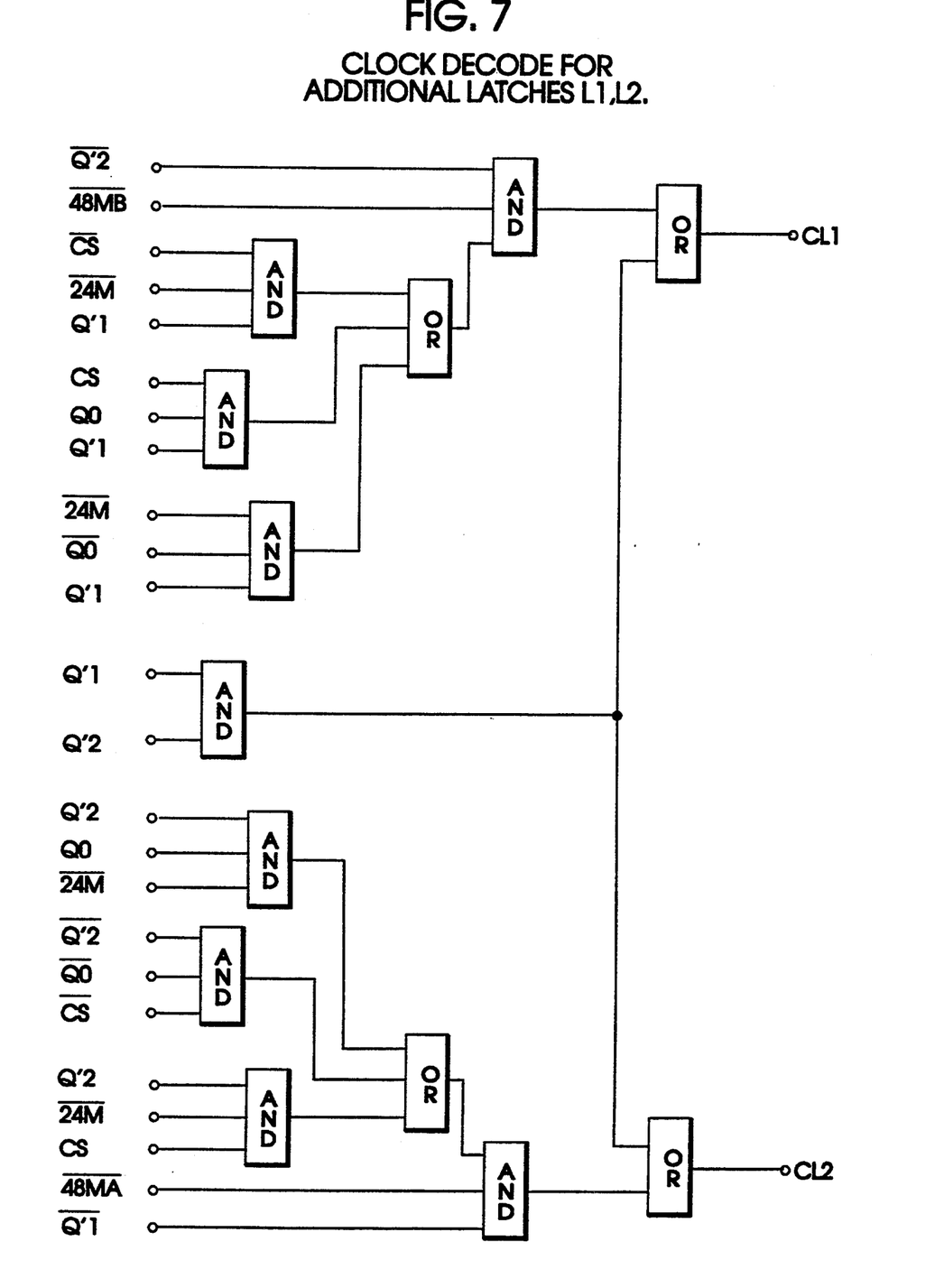
FIG. 7 shows the circuit diagram of the clock decode for additional latches L1, L2 in the preferred embodiment.

FIG. 7 shows the clock decode circuit for additional latches L1 and L2. This circuit depends on the input signals of the combinational circuit (clkA, clkB, CS, user clock) and the state variable input signals (Q0, Q'1, Q'2) and corresponds to the equations of clock 1 and clock 2 obtained thanks to the Karnaugh maps.

The invention described above is used in an environment which requires 3 inputs and 2 additional latches. It may be generalized in an environment in which more inputs and latches are required. Therefore, the description of the preferred embodiment should not be construed as a limitation on the scope of the present invention since it is well within the skill of one skilled in the art to make minor changes to the present invention and to adapt it to such an environment.

I claim:

1. A finite state machine connected to a plurality of units for managing the execution of M asynchronous signals to select, independently from a clock signal (7) of the state machine, a signal among a set of primary input signals (3) received by the state machine, said state machine including a combinational logic means (1) receiving said set of primary input signals (3) which contains N asynchronous input signals and outputting state variable output signals (6) to a state variable register (2), said state variable register being driven by the clock signal (7) and providing M state variable register output signals (51, 52), said finite state machine being characterized in that it comprises:

logic means (1) for generating M timing pulses (71, 72) according to the N asynchronous input signals (81, 82, 83, CS) to indicate the moment of the selection, said means being connected to the combinational logic means (1), and storing means (10, 20) for receiving said M state variable register outputs (51, 52) and being driven by said M timing pulses (71, 72) to generate M output signals (53, 54) each one enabling to select one of the input signals of the state machine at that moment, said M output signals loop back to the combinational logic means to indicate the present state of the state machine.

2. The finite state machine according claim 1, wherein the signal to be selected is one of clock signals (81, 82) comprised among said set of primary input signals further including:

selection means (110) for selecting among the clock signals (81, 82) of the primary inputs the one which should be used as a user clock for the units which are connected to the state machine, said selection means comprising M AND gates wherein each AND gate receives one of the output signals (53 or 54) from the state machine and one of the input clock signals (81, 82) and issues a signal to a unique OR gate for the selection.

3. The finite state machine according to claim 2 wherein at least one of the N asynchronous input signals is the clock signal selected by the state machine divided by two in order to satisfy duty cycle requirement of fifty per cent at a up-level and at a down-level.

4. A method to be implemented in a finite state machine connected to a plurality of units managing the execution of M asynchronous signals to select independently from a clock signal (7) of the state machine, a signal among a set of primary input signals (3) received by the state machine, said state machine including a combinational logic means (1) receiving said set of primary input signals (3) which contains N asynchronous input signals and outputting state variable output signals (6) to a state variable register (2), said state variable register being driven by the clock signal (7) and providing M state variable register outputs (51, 52), and M storing means (10, 20) are provided, each one receiving one of said M state variable register output signals (51, 52), said method comprising the steps of:

(a) receiving in the combinational logic means (1) said set of primary input signals (6) including the N asynchronous input signals (81, 82, 83), (b) outputting from the combinational logic means (1), according to said primary input signals (3) and the present state signals (50, 53, 54) of the state machine which are the state variable input signal and the output signals of said M storing means (10, 20), the state variable output signals (6) of the state machine to said state variable register (2), (c) generating from the state variable register (2) M state variable register outputs (51, 52), (d) storing in each one of said M additional means (10, 20) said M state variable register outputs (51, 52), and (e) generating from the combinational logic means (1) a timing pulse (71 or 72) according to the N asynchronous input signals that are received among said set of primary input signals (3) to a corresponding storing means (10 or 20), which generates therefrom a signal which enables to select one of the primary input signals.

* * * * *